Oct. 6, 1970       F. H. REES       3,533,066
CHECKER FOR n OUT OF m SIGNALS
Filed March 15, 1967
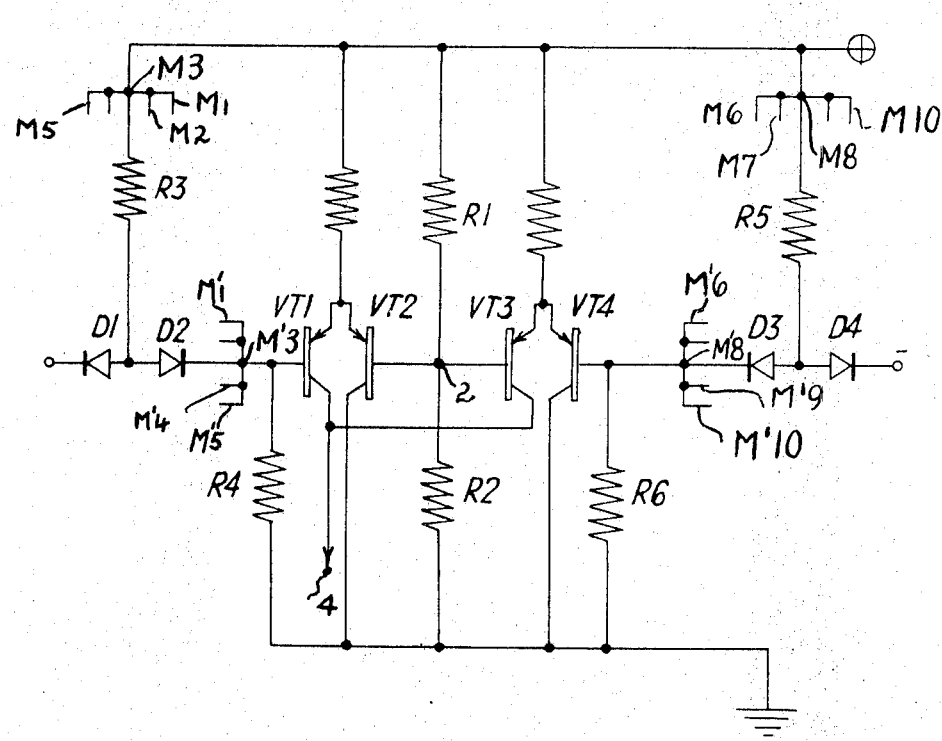
Inventor
F. H. REES
By D. G. Warner
Attorney

United States Patent Office 3,533,066
Patented Oct. 6, 1970

3,533,066
CHECKER FOR n OUT OF m SIGNALS
Frederick Henry Rees, Paddington, London, England, assignor to International Standard Electric Corporation, New York, N.Y., a corporation of Delaware
Filed Mar. 15, 1967, Ser. No. 623,405
Claims priority, application Great Britain, Mar. 25, 1966, 13,273/66
Int. Cl. G05b *1/01*; H03k *19/08*
U.S. Cl. 340—146.1                    5 Claims

ABSTRACT OF THE DISCLOSURE

A two-out-of-five checking device employing analogue techniques is provided to determine parity. A number of current increments equal to the number of code elements at a level of signal strength 1 is compared with a reference signal separately by two long-tailed pair comparators one of which responds for more than two elements at level 1 and the other of which responds for less than two elements at level 1.

---

This invention relates to an electrical circuit for checking whether the correct number of elements in a constant ratio code is in a given condition—referred to as the operated condition. This is usually the logical "1" referred to hereinafter as the first condition.

The present invention is intended to provide an electrical circuit for indicating whether a code combination in an $n$-out-of-$m$ code contains more or less than $n$. elements in a first of two possible conditions. A preferred embodiment includes a first set of $m$ input circuits, one per element position of a code combination. Each said input circuit is energized if its element is in said first condition. Means are also provided to sum, or total, the current increments due to the energized input circuits and a first comparator is adapted to compare the result of said summation with a reference current and to give an output if the number of energized input circuits falls below $n$. A second set of $m$ input circuits is also provided, one per element position of a code combination. Each said input circuit of said second set is energized if its element is in said first condition. Means are provded to sum, or total, the current increments due to the energized input circuits, and a second comparator is adapted to compare the result of said second named summation with a reference current and to give an output if the number of energized input circuits rises above $n$. As a consequence of the two comparisons an output signal is provided if there are either more or fewer than $n$ inputs. No output signal is supplied from the comparators if $n$ inputs are present.

An embodiment of the invention for checking correctness or error in the parity in a two-out-of-five code, such as is much used in telephony, will now be described with reference to the accompanying drawing.

By contrast with most $n$-out-of-$m$ checking circuits, circuits constructed in accordance with the present invention perform their comparison by the use of analogue techniques rather than digital techniques. It uses two long-tailed pair comparators, which are defined in the paragraph below. One of these compares a current derived by the summation of increments of current (at a level 1) per code element with a reference current, giving an output if current at level 1 is supplied to *less than n* elements. In the case of a two-out-of-five checker, this first comparator provides an output if zero or one element has a signal at level 1. The other comparator is similar, except that it gives it output for *more than n* elements at level 1, so that in the two-out-of-five case it gives an output if three or more elements are at 1. No output occurs when $n$ elements are at 1.

A long-tailed pair has been defined as an arrangement of similar vacuum tubes operated with equal anode loads and with a common cathode bias resistor. With such a long-tailed pair input signals of equal amplitude and in phase, or equal DC signals, produce no difference in output voltage between the plate circuits. AC signals of equal amplitude but having a phase difference, or unequal DC signals, produce a difference of potential between the two plate circuits. This definition can be extended to transistor circuits operating as a comparator where two long-tailed pairs using similar transistors are employed. The exact relationships involved should be clear from the following paragraph.

In the drawing, the first of these two comparators includes transistors VT1 and VT2 connected as a long-tailed pair, and the second includes transistors VT3 and VT4 also connected as a long-tailed pair. A single resistive potential divider R1–R2 provides reference currents or a reference potential at 2 for both comparators. The magnitudes of the resistors R1 and R2 and the position (ohmically) of the tap to which the bases of VT2 and VT3 are connected determine the current levels to which the comparators respond.

The current increments for the first comparator come from five identical gating inputs, one per bit place of the code combination, these being energized from a staticizer (not shown) in which the code combination to be checked has been received, Only one gating input is shown, the "multiple" signs at M1, M2 . . . M5 and M'1, M'2 . . . M'5 indicating that there are five such inputs in parallel. Each of these inputs includes a resistor R3 and two diodes D1 and D2 connected as shown. As long as at least two inputs are positive at the required level with respect to the point of comparison at 2, the base of VT1 is positive relative to the base of VT2, so VT2 conducts. However, if the number of elements at level 1 falls below two, then less than two of the inputs to VT1 are energized, in which case the current into the junctor at the base of VT1 decreases and the potential at the base of VT1 also decreases so that it becomes negative relative to that at the base of VT2. This causes VT1 to conduct and VT2 to be cut off, and produces a current output in the collector circuits of VT1. This current provides an error indication at terminal 4. Terminal 4 can be connected to any suitable indicator or alarm device.

The other comparator has a similar set of inputs M6, M7 . . . M10 and M'6, M'7 . . . M'10 which are controlled in a similar manner to that used for VT1. One of these is illustrated and includes a resistor R5 and diodes D3 and D4. The current increments from these inputs are summed in the common resistor R6. As long as no more than two inputs are at a level corresponding to 1, the base of VT4 is negative to that of VT3, so that VT4 conducts. If the number of inputs at 1 should exceed two, then the increased current flow in R6 means that the base of VT3 is negative to that of VT4, so that VT3 would then conduct and VT4 would cut off. This gives a collector current from VT3, which forms an error indication at terminal 4.

In the arrangement shown, the collectors of VT1 and VT3 are connected together to a common output 4 so that when there is any faulty combination the single common output is energized. If it is considered desirable these outputs could be separate, in which case the output which is energized when a faulty combination occurs indicates whether the fault is due to insufficient elements at 1 or too many at 1.

The circuit shown uses a single potential divider as a reference source for both long-tailed pairs of transistors, but in certain cases it may be preferable to use separate reference sources.

With different numbers of input circuits and different values of the resistors R4 and R6 different $n$-out-of-$m$ checks, e.g. 3 out of 10, are possible, subject to the adequacy of the resistors' tolerances.

What is claimed is:

1. An electrical circuit for indicating whether a code combination in an $n$-out-of-$m$ code contains more or less than $n$ elements in a first of two possible conditions, comprising a first set of $m$ input circuits, each circuit corresponding to one element position of a code combination, each said input circuit being energized if its element is in said first condition, means to sum current increments due to the energized input circuits, a first comparator adapted to compare the result of said summation with a reference current and to give an output on an output terminal if the number of energized input circuits falls below $n$, said first comparator including two transistors having their bases separately connected to receive the result of the summation and the reference current and having their emitters coupled in common and having the collector of one transistor coupled to ground while the collector of the other transistor is coupled to the output terminal, a second set of $m$ input circuits, each circuit corresponding to one element position of a code combination, each said input circuit of said second set being energized if its element is in said first condition, means to sum the current increments due to the energized input circuits, and a second comparator adapted to compare the result of said second named summation with a reference current and to give an output on an output terminal if the number of energized input circuits rises above $n$, said second comparator including two transistors having their bases separately connected to receive the result of the summation and the reference current and having their emitters coupled in common and having the collector of one transistor coupled to ground while the collector of the other transistor is coupled to the output terminal.

2. A circuit as claimed in claim 1, in which each said comparator is a two-transistor pair, and in which in each pair one transistor base is connected to the appropriate summation means and the other transistor base to its reference current.

3. A circuit as claimed in claim 1 in which a single potential divider is used as a reference current source, a tapping thereon supplying the reference currents for both comparators.

4. A circuit as claimed in claim 1, in which each said input circuit is a gate which when its code element is in the first condition directs a current increment into a resistor, which resistor is common to all inputs of a set and forms the summation means therefor.

5. A circuit as claimed in claim 1, in which the code whose combination is to be checked is a 2-out-of-5 code.

References Cited

UNITED STATES PATENTS

| | | | |
|---|---|---|---|
| 3,155,841 | 11/1964 | Okuda | 340—146.2 X |
| 3,164,727 | 1/1965 | Heyda | 340—146.1 X |

OTHER REFERENCES

Transistor Manual, 7th ed. Syracuse, N.Y., General Electric Company, 1964, pp. 199–200.

Carter, H. Dictionary of Electronics. London, George Newnes Ltd., 1963, p. 168.

MALCOLM A. MORRISON, Primary Examiner

R. S. DILDINE, Jr., Assistant Examiner

U.S. Cl. X.R.

340—146.2